United States Patent
Jans et al.

(10) Patent No.: US 6,393,093 B2
(45) Date of Patent: May 21, 2002

(54) X-RAY ANALYSIS APPARATUS WITH AN X-RAY DETECTOR IN THE FORM OF A CCD ARRAY

(75) Inventors: Johannes Cornelis Jans, Eindhoven; Marinus Willem Dirken; Waltherus Wilhelmus Van Den Hoogenhof, both of Almelo, all of (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/747,106

(22) Filed: Dec. 21, 2000

(30) Foreign Application Priority Data

Dec. 24, 1999 (EP) .............................................. 99204540

(51) Int. Cl.$^7$ ........................................... G01N 23/223
(52) U.S. Cl. ........................................................ 378/45
(58) Field of Search ..................................... 348/45–50

(56) References Cited

U.S. PATENT DOCUMENTS 5,491,738 A * 2/1996 Blake et al. ................... 378/47

FOREIGN PATENT DOCUMENTS

DE          19724660 A    12/1997

OTHER PUBLICATIONS

Patent Abstract of Japan: Publication No. 2–136029, Application No.: 63–289280, Date of Publication May 24, 1990, Int'L.

By Eugene P. Bertin, "Principles and Practice of X0ray Spectrometric Analysis" 2$^{nd}$ Edition, Plenum Press, New York–London, Chapter 6, Paragraph 4.

* cited by examiner

Primary Examiner—Craig E. Church

(57) ABSTRACT

The invention relates to a device for X-ray analysis with energy dispersive detection of fluorescent radiation. In order to enable the measurements to be carried out with a suitable position resolution, the analyzing radiation is conducted to the sample (4) by means of an X-ray conducting capillary (6) which is directed to the sample through the detector surface (14). Practically all fluorescent radiation (30) from the sample can be detected in such arrangement. According to the invention a detector is used in the form of an X-ray-sensitive CCD array (12). Such a CCD array provides a better energy resolution in comparison with conventional EDX detectors. Moreover, for such CCD arrays a large amount of sophisticated software is available for reading out; moreover, such CCDs can be readily purchased, for example, as rejected visible light sensitive arrays in which a small number of pixels have dropped out.

5 Claims, 1 Drawing Sheet

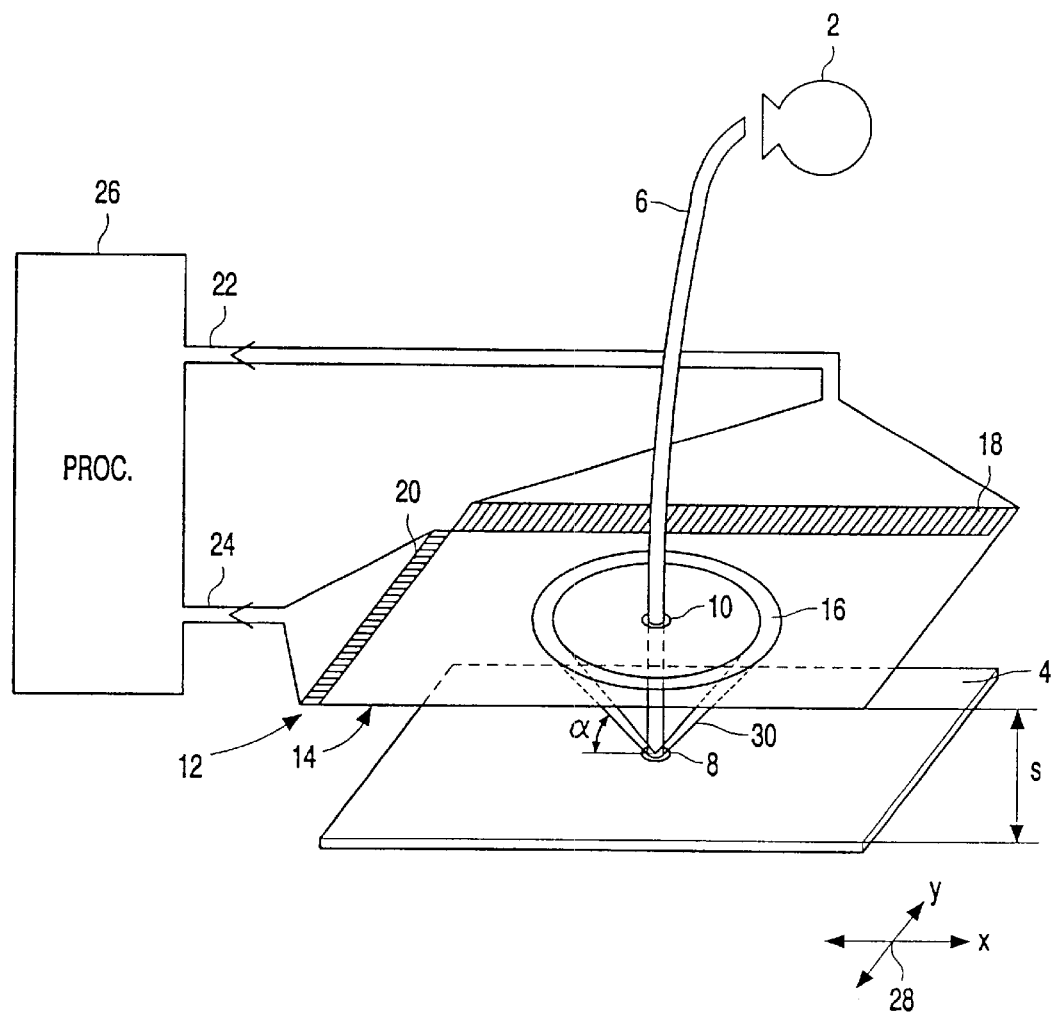

X-RAY ANALYSIS APPARATUS WITH AN X-RAY DETECTOR IN THE FORM OF A CCD ARRAY

The invention relates to an X-ray analysis apparatus which includes:
- a sample location for accomodating a sample to be analyzed,
- supply means for conducting analyzing X-rays to the sample,
- an energy dispersive detector which is provided with a detector surface for the detection of X-rays generated in the sample and is arranged relative to the sample in such a manner that the detector receives the X-rays from the sample at a comparatively large solid angle,
- the supply means including at least one X-ray conducting capillary which is inserted through an opening in the detector surface.

An apparatus of this kind is known from the published German patent application No. 197 24 660 A1.

Generally speaking, X-ray analysis of materials has two techniques available for the detection of the X-rays generated in the sample to be examined, that is, energy dispersive detection ("Energy Dispersive X-ray Detection or EDX") and wavelength dispersive detection ("Wavelength Dispersive X-ray Detection or WDX"). Each of these detection techniques has its specific advantages and drawbacks as will be described in detail hereinafter.

For each photon absorbed in the detector an energy dispersive detector supplies a current pulse whose charge contents are equal to the energy of the photon. These current pulses can be electronically selected in respect of charge contents, so that for all current pulses the number of current pulses of a given charge contents (i.e. the intensity) is determined in one measuring period in dependence on the charge contents (i.e. the energy of the photon). Because the energy of a photon of X-rays is inversely proportional to the wavelength of this radiation, the intensity of the X-rays incident on the detector is thus determined as a function of the wavelength. This type of detector includes, for example the known Si(Li) detector. Even though this detector has a rather favorable signal-to-noise ratio in comparison with other energy dispersive detectors (such as a gas-filled detector), this ratio is still comparatively large for small charge contents (i.e. long wavelengths). This is due to the fact that the spread in the charge contents Q for one given photon energy is proportional to $\sqrt{Q}$; this effect, therefore, increases towards a low Q. This means that in practice X-rays excited by elements having an atomic number lower than 11 cannot be measured, or only with great difficulty, by means of an energy dispersive detector. (For this problem see also "Principles and Practice of X-ray Spectrometric Analysis", $2^{nd}$ ed. by Eugene P. Bertin, Plenum Press, New York-London, chapter 6, paragraph 4.)

Each photon in a detector of the wavelength dispersive type is converted into an electric pulse whose pulse amplitude and/or charge contents are irrelevant to the energy resolution. Thus, this detector determines exclusively the number of photons. Such a detector is formed, for example by an assembly which successively consists of a Soller slit, an analysis crystal and an X-ray count tube. The Soller slit selects the radiation of the desired direction from the beam emanating from the sample; this radiation is subsequently incident on the analysis crystal. In conformity with the known Bragg relation, this crystal reflects only approximately one wavelength, that is, the wavelength that fits the angle of incidence (and a close vicinity thereof, for example, 0.25°) of the selected radiation. The entire desired interval of angles of incidence is traversed by rotating the analysis crystal during the measurement, so that the associated interval of wavelengths is also traversed. The relationship between the radiation intensity (being proportional to the count rate of the count tube) and the wavelength is thus established. Because the radiation applied to the analyzer crystal must be exactly parallel, the crystal is preceded by a collimator, for example a Soller slit. The parallelization of the radiation emanating from the sample strongly reduces its intensity.

As appears from the foregoing, it is a drawback of the WDX detection method that it requires a comparatively complex analysis device and that, because of the reduced X-ray intensity on the detector, the measuring times in such a device are comparatively long. In comparison with WDX an EDX detection method offers the advantage that the construction of the analysis device may be comparatively simple and that comparatively short measuring times are possible. It is a drawback of such a detection method, however, that it enables only a comparatively low maximum count rate only, that is, approximately ten times lower than that of a WDX detector. This comparatively low maximum count rate for a EDX detectors is mainly due to the electronic reading out of the detector.

The cited German patent application describes an X-ray analysis apparatus in which an EDX detection method is used. The analyzing X-rays are applied to the sample in the known apparatus by means of an X-ray conducting capillary which is inserted through an opening in the detector surface. The capillary is aimed at the sample to be analyzed which is arranged so that its surface extends parallel to the detector surface of the energy dispersive detector. Because an X-ray conducting capillary has a small cross-section, small areas of the sample can be selectively irradiated by means of such a capillary, so that a suitable position resolution is achieved on the sample. Furthermore, the detector is arranged near the sample so that the detector receives the X-rays from the sample at a large solid angle. As a result, practically all X-rays emanating from the sample are detected by the detector, so that an as low as possible intensity of the analyzing X-rays suffices. This is of importance notably in the case of samples which are susceptible to radiation damage, for example integrated electronic circuits.

The known poor energy resolution of the known EDX detectors constitutes a further drawback of such detectors. By way of illustration it can be stated that the energy resolution of a conventional EDX detector is of the order of magnitude of 120 eV whereas that of a WDX detector is of the order of magnitude of 30 eV. This is a pronounced drawback notably for chemical elements having a low atomic number (for example, lower than the atomic number 14). This is because such elements have a characteristic radiation of low energy, that is, of the order of magnitude of from 400 eV to 1500 eV. In this energy range said poor resolution may readily give rise to overlap with the characteristic radiation of heavier elements, for example, the M lines of elements having an atomic number 50 or higher, or, for example, the L lines of copper. This impedes the measurement of spectral X-ray lines of said light elements in this range.

The described drawbacks of the known EDX detectors are of importance notably for the execution of measurements on integrated electronic circuits in which frequently light elements such as boron, nitrogen, oxygen, fluorine and aluminium have to be measured. The metals copper and tungsten are frequently present in such environments and their characteristic M radiation could make measurements impossible in practical circumstances.

It is an object of the invention to provide an X-ray analysis apparatus of the kind set forth which is suitable for the measurement of low-energetic X-rays with a suitable energy resolution while preserving the described advantages (such as a suitable position resolution on the sample, a comparatively simple construction and a low radiation load for the sample). To this end, the apparatus according to the invention is characterized in that the energy dispersive detector is constructed as an X-ray sensitive charged coupled device array. The invention is based on the recognition of the fact that nowadays CCD arrays are available that are suitable for use with visible light and also for the detection of soft X-rays. Such CCD arrays have an energy resolution of the order of magnitude of 90 eV; this represents a distinct improvement in comparison with the resolution of the conventional EDX detectors and considering the described problem of overlapping of the soft X-ray lines to be detected by the characteristic radiation of heavier elements. Use can also be made of the additional advantage that for said CCD arrays for visible light a vast amount of software is available for the fast and efficient reading out of the CCD array, so that the electronic read-out circuitry does not impose restrictions as regards the speed of the CCD array. Consequently, the count rate of such a detector may reach a value as high as $10^6$ quanta per second; this comparable to that of a WDX detector.

Another advantage of the use of a CCD array consists in the fact that visible light CCDs in which some pixels are defective can be used for this purpose. Such CCDs are not suitable for visible light applications, such as video image reproduction, so that they do not pass the production tests. For the present X-ray application, however, such CCDs can still be used very well, because often only merely the overall X-ray yield to be measured is of importance rather than the rendition of the individual pixels.

In one embodiment of the invention the detector surface of the charged coupled device array is not provided with a cover layer. Conventional CCDs for use with visible light are always provided with a light transparent cover layer having a thickness of some tenths of a millimeter in order to protect the light-sensitive detector surface against damage. Such a cover layer, however, could cause a high absorption of the X-rays to be detected, so that it must be removed (in the case of conventional, commercially available CCDs for visible light applications) or must be omitted already during the production (in the case of CCDs manufactured especially for X-ray applications).

In another embodiment of the invention the detector surface is situated at a small distance from the sample surface. It is thus achieved that the detecting surface of the detector "sees" the sample at an as large as possible solid angle (for example, more than 80% of a semi-sphere around the sample, so larger than approximately 5 staradian), so that the advantage of optimum detection efficiency is preserved. This is of major importance for measurements where the sample is irradiated with a small X-ray spot in order to achieve suitable position resolution and, moreover, the X-ray spot has a low intensity. For such measurements it is desirable to collect as much X-radiation as possible from the irradiated spot on the sample.

Furthermore, due to the small distance between the sample surface and the detector surface there will be no or only negligible absorption of the soft X-rays in gases, if any, present between said two surfaces. Consequently, it is not necessary to create a specially conditioned environment in the form of a vacuum for the measurement; it suffices to use an atmosphere of, for example, dried nitrogen which has a positive effect on the simplicity of the equipment. In this context a small distance s between the CCD surface D and the sample surface is to be understood to mean a distance such that the value of s/D is smaller than, for example 0.2.

In another embodiment of the invention the X-ray conducting capillary produces an X-ray spot of a diameter of no more than 50 μm on the sample. Considering the present detailing of integrated electronic circuits, a useful analysis of the surface on which ICs is formed can already be performed by means of an X-ray spot of such dimensions which irradiates the part of the wafer surface which is situated between the regions in which the actual electronic circuits are situated. Such intermediate regions are considerably larger than the smallest details of the circuits. Consequently, commercially available X-ray conducting capillaries can be used to irradiate the sample surface.

The diameter of the X-ray spot on the sample in another embodiment of the invention is no more than 10 μm. Special state-of-the-art capillaries can be used for applications for which the commercially available capillaries are still too large. Nowadays such capillaries can produce an X-ray spot smaller than approximately 10 μm.

In another embodiment of the invention the reading out of the charged coupled device array is performed selectively on the basis of regions thereof.

This step makes it possible to perform angle-dependent measurements, meaning that the radiation intensity to be measured can be determined in dependence on the angle, relative to the sample surface, at which the radiation emanates from the sample by selection of given regions of pixels in the array.

The invention will be described in detail hereinafter with reference to the sole FIGURE. This FIGURE is a partial perspective view of an arrangement for the energy-dispersive detection of fluorescent X-rays generated in a sample. Using an X-ray source 2, for example a conventional X-ray tube, analyzing X-rays are generated in order to irradiate the sample 4 to be analyzed in this arrangement. This sample is, for example, a substrate (wafer) for the manufacture of integrated electronic circuits. The analyzing X-rays are conducted from the X-ray tube 2 to the sample 4 by means of supply means in the form of an X-ray optical capillary or a bundle of such capillaries 6. This X-ray optical capillary takes up the radiation at the area of the X-ray tube 2 and transports it, by way of total internal reflection, more or less without loss to the region 8 of the sample to be analyzed. An energy dispersive detector 12 with a detector surface 14 for the detection of X-ray 30 generated in the sample is arranged at a small distance from the sample surface to be analyzed. The surface 14 is provided with an opening 10 wherein the X-ray optical capillary 6 is arranged in such a manner that the end of the capillary can irradiate the region 8 of the sample surface selected for X-ray analysis. Commercially available X-ray optical capillaries have a dimension (diameter of the cross-section) such that they can produce an X-ray spot smaller than 50 μm at their exit end. If desired, an X-ray spot smaller than 10 μm can even be realized.

The analyzing X-rays produce fluorescent radiation 30 in the sample, which radiation provides information notably as regards the chemical elements present in the sample. The fluorescent radiation 30 propagates in all directions from the irradiated region 8, that is, in the entire space above the sample surface. It is important to detect an as large as possible part of this radiation, because it then suffices to use an as small as possible radiation dose for the X-ray-sensitive sample. This is even more important in situations in which a very small region of the sample 4 is to be analyzed, that is, analysis with a high position resolution. In order to detect an as large as possible part of the fluorescent radiation, the detector surface should be arranged as near as possible to the sample surface, so that all radiation emanating from the sample is collected by the detector. The FIGURE does not show the desired situation with the correct ratios, because the ratio s/D of the distance s between the two surfaces to the dimension D (for example, the diameter) of the detector is preferably less than 0.2. It is desirable to keep the distance between the sample and the detector surface as small as possible also to avoid X-ray absorption in the surrounding atmosphere. The region 8 of the sample 4 to be examined can be selected by shifting the sample in the x direction or the y direction as symbolically indicated by the arrows 28.

The detector is formed by an X-ray sensitive charged coupled device array or CCD array. Such CCD arrays are commercially available, for example, a Philips "FT 17" sensor". The CCD array is constructed in the form of an integrated circuit, preferably a circuit having a very small dark current. Moreover, it is desirable that the detector surface of the charged coupled device array is not provided with a cover layer, so that the X-ray absorption remains as low as possible. The CCD array is cooled by a cooling device (not shown) during operation, for example, by an array of Peltier cooling elements which cools the CCD array to a temperature of the order of magnitude of −70°. The rows and columns of the CCD array are connected to arrays 18 and 20, respectively, of terminals which are connected to an electronic read-out device 26 via data channels 22 and 24, respectively.

The detector can operate in such a manner that only the total X-ray power emanating from the sample is detected, which means that no distinction is made as regards the location on the detector where the X-rays are received. However, it is alternatively possible to perform angle-dependent measurements, that is, to determine the intensity of the fluorescent X-rays 30 in dependence on the angle a between the sample surface and the direction of importance. This can be achieved by suitably controlling the read-out electronic circuitry which successively reads out the circular regions of X-ray-sensitive detector elements which are associated with a given angle α.

What is claimed is:

1. An X-ray analysis apparatus which includes:

a sample location for accommodating a sample to be analyzed, supply means for conducting analyzing X-rays to the sample, an energy dispersive detector which is provided with a detector surface for the detection of X-rays generated in the sample and is arranged relative to the sample in such a manner that the detector receives the X-rays from the sample at a comparatively large solid angle, the supply means including at least one X-ray conducting capillary which is inserted through an opening in the detector surface, wherein the energy dispersive detector is constructed as an X-ray sensitive charged coupled device array, and wherein the detector surface of the charged coupled device array is not provided with a cover layer.

2. An apparatus as claimed in claim 1, wherein the reading out of the charged coupled device array is performed selectively on the basis of regions (16) thereof.

3. An apparatus as claimed in claim 1, wherein the detector surface (14) is situated at a small distance from the sample surface (4).

4. An apparatus as claimed in claim 1, wherein the X-ray conducting capillary (6) produces an X-ray spot (8) of a diameter of no more than 50 $\mu$m on the sample.

5. An apparatus as claimed in claim 4, wherein the X-ray spot on the sample has a diameter of no more than 10 $\mu$m.

* * * * *